United States Patent Office 2,822,147
Patented Feb. 4, 1958

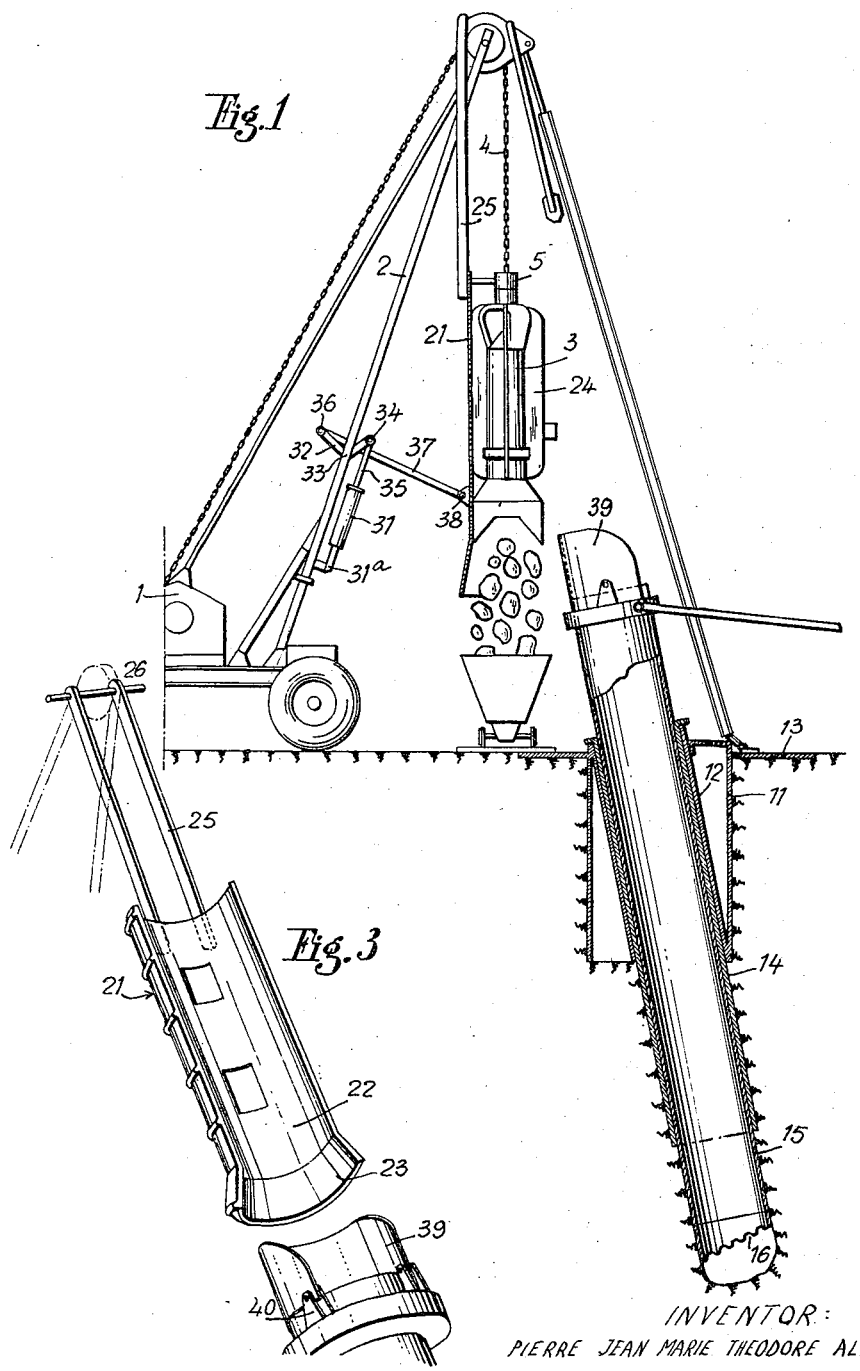

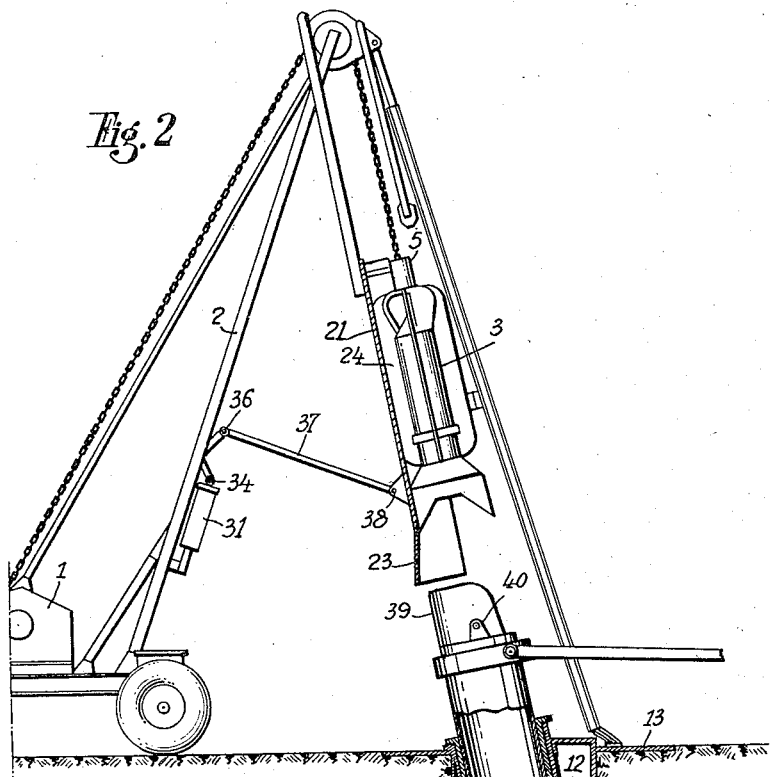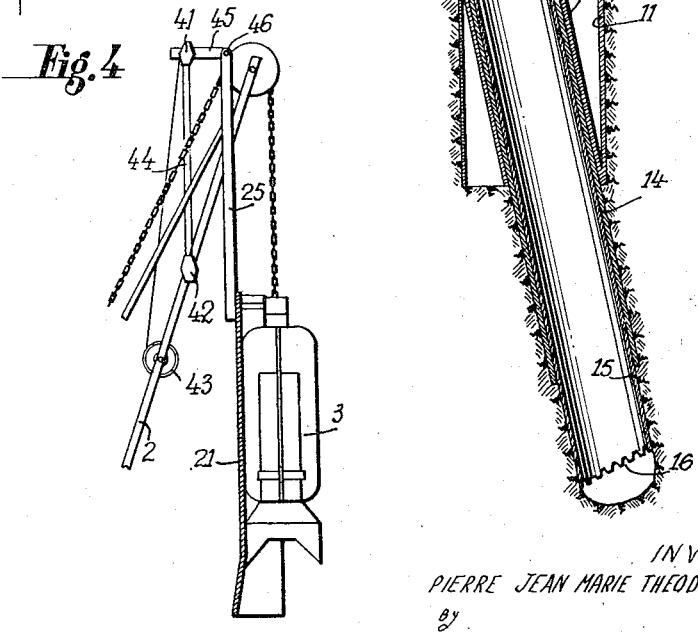

2,822,147
GUIDE DEVICE FOR BORING TOOLS
Pierre Jean-Marie Theodore Allard, Eaubonne, France
Application June 8, 1954, Serial No. 435,227
Claims priority, application France, June 15, 1953
10 Claims. (Cl. 255—1)

The present invention has for object to provide a device for holding and guiding a boring tool in two directions pertaining respectively to the axis of the bore or excavation and the emptying or discharging position of the tool.

When boring holes with any kind of boring device (boring grab, sand valve) the material extracted by the boring tool must be discharged or dumped at a point remote from the axis of the bore; on the other hand, it is necessary that the boring tool, after discharging the material contained therein, be re-positioned in alignment with the axis of the bore in a rapid and accurate manner so as to avoid useless movements and loss of time.

In a particular case, when the axis of the bore is at an angle to the vertical, the discharging position may correspond to a vertical position of the tool but the operative or working position of the latter obviously corresponds to an inclined position exactly coinciding with the axis of the bore. Hence it is necessary to arrange that the tool be brought and maintained in exact alignment with this axis. This is the case with inclined bores or excavations executed according to a method which will be described hereinunder as an example of an application of the present invention and with the use of an inclined boring tube which will also be described and illustrated.

The device according to the present invention is characterized in that it comprises in combination, a tool guide cradle permitting the boring tool to be maintained and guided in a position which may have, within certain limits, any inclination, and a shifting device whereby said guide cradle can be swung so as to bring the tool either to the boring position or to the discharging position.

Other features and advantages of the present invention will appear from the ensuing description with reference to the accompanying drawings, in which:

Fig. 1 is an elevational view partly in section of boring equipment applied to oblique boring and comprising the guide device embodying the invention, the boring tool being shown in its discharging position;

Fig. 2 is a view similar to that of Fig. 1, the boring tool being shown in its inclined position in alignment with the axis of the boring tube;

Fig. 3 is a perspective view of the guide device; and

Fig. 4 is an elevational view of a modification of the device embodying the invention.

According to the embodiment shown in Fig. 1, the device is incorporated in boring equipment in which a boring machine comprises a winch 1 (partially shown), a boring boom 2, and a boring tool 3 suspended from a cable 4 and adapted to hook up in the known manner with a device 5 whereby the tool is automatically opened.

In the case chosen by way of example, the equipment is adapted to effect an inclined bore or excavation and comprises for this purpose a caisson 11 including an inclined tube 12 and a support plate 13, and a guide tube 14, the boring tube itself 15 being provided with a special cutting tool 16.

The actual device for guiding the tool comprises a guide cradle 21, shown in perspective in Fig. 3, including a semi-cylindrical part 22 terminated at its lower end by a slightly divergent or flared part 23. The size of this cradle is related to that of the boring tool, the latter including a number of fins 24 which are longitudinally extending and equispaced on the periphery of the tool. The boring tool is thus maintained in its cradle and accurately guided and any lateral movement is prevented. The cradle is supported by support members 25 pivoted at 26 to the boring boom 2.

For the purpose of permitting it to be rapidly and accurately positioned and directed along the axis of the bore, the guide cradle is connected to a shifting device which may be mechanical or hydraulic and may be operated automatically or manually. In the specific case illustrated the shifting device is of the hydraulic type comprising a fluid motor 31 fixed by a pin 31$^a$ to the boom 2. This fluid motor actuates a bell-crank 32 which is pivoted at 33 to the boom 2 and at one of its ends 34 to the piston rod 35 of the fluid motor 31. At its other end 36 this bell-crank 32 is pivoted to a link 37 which is itself pivoted at 38 to the guide cradle 21.

By means of this fluid motor 31 it is possible to swing the cradle and dispose it either in a vertical position as shown in Fig. 1, which corresponds to the discharging position of the boring tool or, as shown in Fig. 2, in an inclined position in which the tool is in alignment with the axis of the bore.

For the purpose of obtaining an accurate and rapid alignment of the tool with respect to the tube, a support and centering member 39 is provided, which is removably secured at 40 to the end of the boring tube.

The device embodying the invention operates in the following manner:

To execute an inclined bore or excavation, the boring tool is directed in its open position in alignment with the axis of the bore as shown in Fig. 2. To this end, the guide cradle is swung about its pivot 26 so that its axis is in alignment with that of the bore. This is achieved by swinging the boring tool beyond the position it should occupy and slowly allowing it to return until it enters into contact with the inner wall of the member 39. In this way the tool is in perfect alignment with the axis of the boring tube and may be released to drop to the bottom of the bore.

When the tool is hauled up in its closed position and filled with the excavated material, it hooks on the device 5 suspended from the upper end of the boom 2. The fluid motor 31 is then set in motion by means of a suitable pump and, by way of the bell-crank 32 and the link 37, the guide cradle 21 is brought vertically above the discharge point, as illustrated in Fig. 1. The boring tool is then emptied and automatically locks itself in its open position. In reversing the action of the fluid motor 31, the latter returns the boring tool into alignment with the axis of the bore and the boring apparatus recommences a further cycle of operations.

The hydraulic mechanism described above including the fluid motor and the link members may be replaced by a purely mechanical device. An example of the latter is shown in Fig. 4 wherein the device comprises a pulley tackle including a pulley 41 mounted on a lever 45 and another pulley 42 mounted on the boom 2, and a winch 43 on which is wound a cable 44. This mechanical device acts on the lever 45 which is fixed to the support member 25 supporting the cradle 21 and is mounted on the boom 2 for pivotal movement about a pin 46. It will be understood that the inclination of the cradle 21 may be modified in rotating the winch drum in either direction, since the cradle 21 pivoted at 46 to the boom always tends to hang substantially vertically from the latter.

Although specific embodiments of the invention have been described hereinbefore, it is to be understood that many changes and modifications may be made therein without departing from the spirit of the invention or the scope of the appended claims.

The vertical position of the boring tool may be that pertaining to the boring position, or the boring position and the discharging position may both be inclined.

Having now described my invention what I claim as new and desire to secure by Letters Patent is:

1. In a ground boring installation comprising a boring boom, a boring tool and hoisting means connecting the boring tool to the boom for the purpose of hoisting and lowering the boring tool, the combination of a boring tube held in position relative to the ground, a guide for the boring tool adapted to guide the latter along a portion of its descent and pivotably mounted relative to the boom and capable of being pivoted from a first position to a position beyond a second position in which latter position the boring tool guided by the guide is in alignment with the boring tube, a shifting device connected to the guide for pivoting the latter between said positions, a boring tool supporting and positioning member which is detachably connected to the upper end of the boring tube and is capable of entering into contact with and acting as an abutment for the side of the boring tool when the guide is pivoted toward said second position and the boring tool is lowered to such position relative to the guide as to extend below the guide a sufficient distance to contact the positioning member and is under the effect of the guidance of the guide, the position of the positioning member relative to the boring tube being such that when the boring tool abuts thereagainst, the bottom of the boring tool is correctly positioned relative to the boring tube and may be dropped into the latter.

2. Boring installation as claimed in claim 1, wherein the shape of the positioning member is arcuate in a plane perpendicular to the axis of the boring tube, this arcuate shape being concentric with the axis of the latter and the positioning member partially surrounding the bottom end of the boring tool when the latter abuts thereagainst.

3. In a ground boring installation comprising a boring boom, a boring tool and hoisting means connecting the boring tool to the boom for the purpose of hoisting and lowering the boring tool, the combination of a boring tube held in position relative to the ground, a guide for the boring tool adapted to guide the latter along a portion of its descent and pivotably mounted relative to the boom and capable of being pivoted from a first position to a position beyond a second position in which latter position the boring tool guided by the guide is in alignment with the boring tube, a shifting device connected to the guide for pivoting the latter between said positions, a boring tool supporting and positioning member which is detachably connected to the upper end of the boring tube and is capable of entering into contact with and acting as an abutment for the side of the boring tool when the guide is pivoted toward said second position and the boring tool is lowered to such position relative to the guide as to extend below the guide a sufficient distance to contact the positioning member and is under the effect of the guidance of the guide, the position of the positioning member relative to the boring tube being such that when the boring tool abuts thereagainst, the bottom of the boring tool is correctly positioned relative to the boring tube and may be dropped into the latter, the position of the positioning member relative to the boring tube being furthermore such that said abutment occurs when said guide is pivoted in a direction from said position beyond said second position toward said first position.

4. In a ground boring installation comprising a boring boom, a boring tool and hoisting means connecting the boring tool to the boom for the purpose of hoisting and lowering the boring tool, the combination of a boring tube held in an inclined position relative to the ground, a guide for the boring tool adapted to guide the latter along a portion of its descent and pivotably mounted relative to the boom and capable of being pivoted from a first position to a position beyond a second position in which latter position the boring tool guided by the guide is in alignment with the boring tube, a shifting device connected to the guide for pivoting the latter between said positions, a boring tool supporting and positioning member which is detachably connected to the upper end of the boring tube and is capable of entering into contact with and acting as an abutment for the side of the boring tool when the guide is pivoted toward said second position and the boring tool is lowered to such position relative to the guide as to extend below the guide a sufficient distance to contact the positioning member and is under the effect of the guidance of the guide, the position of the positioning member relative to the boring tube being such that when the boring tool abuts thereagainst, the bottom of the boring tool is correctly positioned relative to the boring tube and may be dropped into the latter.

5. In a ground boring installation comprising a boring boom, a boring tool and hoisting means connecting the boring tool to the boom for the purpose of hoisting and lowering the boring tool, the combination of a boring tube held in an inclined position relative to the ground, a guide for the boring tool adapted to guide the latter along a portion of its descent end pivotably mounted relative to the boom and capable of being pivoted from a first position to a position beyond a second position in which latter position the boring tool guided by the guide is in alignment with the boring tube, a shifting device connected to the guide for pivoting the latter between said positions, a boring tool supporting and positioning member which is detachably connected to the upper end of the boring tube and is capable of entering into contact with and acting as an abutment for the side of the boring tool when the guide is pivoted toward said second position and the boring tool is lowered to such position relative to the guide as to extend below the guide a sufficient distance to contact the positioning member and is under the effect of the guidance of the guide, the position of the positioning member relative to the boring tube being such that when the boring tool abuts thereagainst, the bottom of the boring tool is correctly positioned relative to the boring tube and may be dropped into the latter, the position of the positioning member relative to the boring tube being furthermore such that said abutment occurs when said guide is pivoted in a direction from said position beyond said second position toward said first position.

6. In a ground boring installation comprising a boring boom, a boring tool and hoisting means connecting the boring tool to the boom for the purpose of hoisting and lowering the boring tool, the combination of a boring tube held in an inclined position relative to the ground, a guide for the boring tool adapted to guide the latter along a portion of its descent and pivotably mounted relative to the boom and capable of being pivoted from a first position to a position beyond a second position in which latter position the boring tool guided by the guide is in alignment with the boring tube, a shifting device connected to the guide for pivoting the latter between said positions, a boring tool supporting and positioning member which is detachably connected to the upper end of the boring tube and is capable of entering into contact with and acting as an abutment for the side of the boring tool when the guide is pivoted toward said second position and the boring tool is lowered to such position relative to the guide as to extend below the guide a sufficient distance to contact the positioning member and is under the effect of the guidance of the guide, the position of the positioning member relative to the boring tube being such that when the boring tool abuts thereagainst, the bottom of the boring tool is correctly positioned relative to the boring tube and may be dropped into the latter, said shifting device being a hydraulic device including a fluid motor and a system of articulated levers connecting the fluid motor to the guide.

7. In a ground boring installation comprising a boring boom, a boring tool and hoisting means connecting the boring tool to the boom for the purpose of hoisting and lowering the boring tool, the combination of a boring tube held in an inclined position relative to the ground, a guide for the boring tool adapted to guide the latter along a portion of its descent and pivotably mounted relative to the boom and capable of being pivoted from a first position to a position beyond a second position in which latter position the boring tool guided by the guide is in alignment with the boring tube, a shifting device connected to the guide for pivoting the latter between said positions, a boring tool supporting and positioning member which is detachably connected to the upper end of the boring tube and is capable of entering into contact with and acting as an abutment for the side of the boring tool when the guide is pivoted toward said second position and the boring tool is lowered to such position relative to the guide as to extend below the guide a sufficient distance to contact the positioning member and is under the effect of the guidance of the guide, the position of the positioning member relative to the boring tube being such that when the boring tool abuts thereagainst, the bottom of the boring tool is correctly positioned relative to the boring tube and may be dropped into the latter, said shifting device being a mechanical device including a winch operatively connected to the guide by a pulley tackle.

8. In a ground boring installation comprising a boring boom, a boring tool and hoisting means connecting the boring tool to the boom for the purpose of hoisting and lowering the boring tool, the combination of a boring tube held in an inclined position relative to the ground, a guide for the boring tool adapted to guide the latter along a portion of its descent and pivotably mounted relative to the boom and capable of being pivoted from a first position to a position beyond a second position in which latter position the boring tool guided by the guide is in alignment with the boring tube, a shifting device connected to the guide for pivoting the latter between said positions, a boring tool supporting and positioning member which is detachably connected to the upper end of the boring tube and is capable of entering into contact with and acting as an abutment for the side of the boring tool when the guide is pivoted toward said second position and the boring tool is lowered to such position relative to the guide as to extend below the guide a sufficient distance to contact the positioning member and is under the effect of the guidance of the guide, the position of the positioning member relative to the boring tube being such that when the boring tool abuts thereagainst, the bottom of the boring tool is correctly positioned relative to the boring tube and may be dropped into the latter, the length of the guide and the length of co-operating guide-contacting faces on the boring tool being extensive relative to the cross-sectional area of the latter.

9. Boring installation as claimed in claim 8, wherein the guide is substantially in the form of a segment of a cylinder coaxial with the boring tool.

10. Boring installation as claimed in claim 9, wherein the boring tool is provided with longitudinally extending fins some of which co-operate with the guide and thereby guide the boring tool.

References Cited in the file of this patent

FOREIGN PATENTS

| | | |
|---|---|---|
| 773,629 | France | Sept. 3, 1934 |
| 775,485 | France | Oct. 8, 1934 |
| 1,042,271 | France | June 3, 1953 |